United States Patent [19]
Murray et al.

[11] Patent Number: 5,790,562
[45] Date of Patent: Aug. 4, 1998

[54] CIRCUIT WITH BUILT-IN TEST AND METHOD THEREOF

[75] Inventors: Brian Thomas Murray, Novi, Mich.; Krishnendu Chakrabarty, Norwood, Mass.; John Patrick Hayes, Ann Arbor, Mich.

[73] Assignee: General Motors Corporation, Detroit, Mich.

[21] Appl. No.: 643,401

[22] Filed: May 6, 1996

[51] Int. Cl.$^6$ .................... H04B 17/00; G11C 29/00
[52] U.S. Cl. .............. 371/22.4; 371/22.5; 371/22.6
[58] Field of Search ................. 371/22.4, 22.1, 371/22.2, 22.5, 22.6, 24, 25.1, 27, 20.11, 21.2, 65, 67.1; 395/183.13, 183.18, 183.21

[56] References Cited

U.S. PATENT DOCUMENTS

| | | | |
|---|---|---|---|
| 5,138,619 | 8/1992 | Fasang et al. | 371/21.1 |
| 5,173,906 | 12/1992 | Dreibelbis et al. | 371/22.5 |
| 5,301,199 | 4/1994 | Ikenaga et al. | 371/22.5 |
| 5,586,125 | 12/1996 | Warner | 371/27 |

OTHER PUBLICATIONS

LFSR Based Deterministic & Pseudo–Random Test Pattern Generator Structures, C. Duraza & G. Cambon; Univ. of Montpellier II, pp. 27–24.

LFSR Coded Test Patterns for Scan Designs, Dr. Bernd Konemann, c/o IBM Corp. Poughkeepsie, NY; pp. 237–242.

Generation of Vector Patterns Through Reseeding of Multiple–Polynomial Linear Feedback Shift Registers; S. Je;;ebramd, S. Tarnick, J. Rajski; 1989 IEEE; pp. 120–129.

An Efficient BIST Scheme Based on Reseeding of Multiple Polynomial Linear Feedback Shift Registers; S. Venkataraman, J. Rajski, S. Hellebrand, S. Tarnick; 1993 IEEE; pp. 572–577.

Exhaustive Generation of Bit Patterns With Applications to VLSI Self–Testing; Z. Barzilai, D. Coopersmith, A. Rosenberg; 1983 IEEE; pp. 190–194.

Circuits for Pseudo–Exhaustive Test Pattern Generation; Laung–Terng Wang, Edward J. McCluskey Center for Reliable Computing; 1986 International Test Conf.; 1986 IEEE; pp. 25–37.

Store and Generate Built–In–Testing Approach; V. K. Agarwal and E. Cerny; 1981 IEEE; pp. 35–40.

Hardware Test Pattern Generation for Built–In Testing; W. Daehn and J. Mucha; Univ. of Hannover, West Germany; 1981 Test Conference; Paper 4.6; pp. 110–113.

High–Level Test Generation Using Physically–Induced Faults; M. Hansen and J. Hayes; Univ. of Michigan, Ann Arbor, MI; Proceedings of the 12th VLSI Test Symposium, Princeton, NJ; May 1995.

A Tutorial on Built–In Selt–Test; V. Agrawal, C. Kime K. Saluja; 1993 IEEE; Mar. 1993 pp. 73–82; Part 1: Principles.

A Tutorial on Built–In Self–Test; Part 2: Applications; V. Agrawal, C. Kime, K. Saluja; 1993 IEEE; Jun. 1993; pp. 69–77.

(List continued on next page.)

*Primary Examiner*—Hoa T. Nguyen
*Attorney, Agent, or Firm*—Anthony Luke Simon

[57] ABSTRACT

A circuit with a built-in self test, comprising: a circuit to be tested; a generating circuit coupled to the circuit to be tested, wherein the generating circuit generates (i) a series of input signals to the circuit to be tested and (ii) a series of reference signals; a space compaction circuit coupled to an output of the circuit to be tested, wherein the space compaction circuit uses a categorized response of the circuit to be tested to compact the output of the circuit to be tested by a maximum ratio and produces a series of output signals when the input signals are applied to the circuit to be tested; an analysis circuit coupled to the space compaction circuit and the generating circuit, providing a signal indicative of error in the circuit to be tested when the output signals fail to correspond to the reference signals.

10 Claims, 5 Drawing Sheets

OTHER PUBLICATIONS

Signature Analysis: A New Digital Field Service Method; Robert A. Frohwerk; Hewlett Packard Journal; Hewlett Packard Co., 1977: pp. 2–8.

A Data Compression Technique for Built–In Self–Test; S. Reddy, K. Saluja, M. Karpovski; 1988 IEEE; vol. 37, No. 9; pp. 1151–1156.

Efficient Test Response Compression for Multiple–Output Circuits; K. Chakrabarty and J. Hayes Univ. of Michigan, Ann Arbor, MI; 1994 IEEE; Paper 21.3; pp. 501–510.

Parity–Scan Design to Reduce the Cost of Test Application; H. Fijiwara and A. Yamamoto; 1993 IEEE; vol. 12, No. 10; pp. 1604–1611.

Space Compression Methods With Output Data Modification; Yiu Kei Li and John P. Robinson 1987 IEEE; vol. Cad–6, No. 2; pp. 290–294.

Optimal Time and Space Compression of Test Responses for VLSI Devices; M. Karpovski and P. Nagvajara; Boston University; 1987 IEEE; Paper 21.3; pp. 523–529.

Space Compression Method for Built–In Self–Testing of VLSI Circuits; Wen–Ben Jone and Sunil R. Das; International Journal of Computer Aided VLSI Design 3 (1991); pp. 309–322.

Selecting Programmable Space Compactors for BIST Using Genetic Algorithms; B. Tsuji, A. Ivanov and Y. Zorian; 1994 Asian Test Symposium; pp. 233–241.

An Improved Output Compaction Technique for Built–In Self–Test in VLSI Circuits; Sunil R. Das, Huong T. Ho, Wen–Ben Jone & Amiya R. Nayak; 8th Int'l. Conference on VLSI Design; Jan. 1995.

Programmable Space Compaction for BIST; Yervant Zorian and Andre Ivanov; 1993 IEEE; pp. 340–349.

Test Set Embedding in a Built–In Self Test Environment; Sheldon B. Akers and Winston Jansz; 1989 IEEE; Paper 13.2 pp. 257–263.

CIRCUIT WITH BUILT-IN TEST AND METHOD THEREOF

This invention was made with government support under Grant No. MIP-9200526 awarded by the National Science Foundation. The government has certain rights in the invention.

This invention relates to a circuit with built-in test and a method thereof.

BACKGROUND OF THE INVENTION

FIG. 1 illustrates a generic example of a known test method for testing a digital circuit. The method incorporates into the circuit a test signal generator 10 that provides test patterns to the various inputs of the circuit under test 12. In response to the generated test patterns, the circuit under test 12 provides an output signal on its output lines. The output signal is compacted, typically in time and space, by the response compactor 14, which provides, on line 15, a signature of the circuit output. Comparator circuit 16 compares the signature on line 15 to the reference signature on line 17 and indicates an error signal on line 18 whenever the signal on line 15 does not correspond to the reference signature signal on line 17.

Various categories of circuit testing fall within the method described with reference to FIG. 1, including pseudoexhaustive, pseudorandom and deterministic. Known pseudoexhaustive and pseudorandom testing techniques do not provide guaranteed full fault coverage and, while some provide nearly full fault coverage, the test sequence may take a long time to complete. Deterministic tests, which provide full fault coverage, have been avoided in many instances because they typically require a high degree of hardware, i.e., a large on-chip space for the test generator and response compactor circuits, and thus are not practical for universal application. Even when deterministic patterns have been implemented, the response compactor rarely avoids aliasing of the signal, reducing fault coverage. Thus, most known techniques for built-in self-tests are accompanied by a degree of error so that the effectiveness of the test is not 100 percent.

Aliasing occurs because the many compaction processes have an inherent filtering effect on the compacted signal. It is possible that errors that would be detected absent compaction are filtered and do not appear in the output signal and thus, in the end, are undetected. Many times, if these errors that would otherwise be filtered are identified during the circuit design, the test generator circuit can be altered to create a test pattern to identify the fault and prevent it from being filtered by the space compactor, but such modifications add complexity to the test generator circuit. Alternatively, the compaction circuit can be altered to prevent the fault from being filtered, but such modifications add complexity to the compaction circuit. No systematic method has previously been shown to guarantee avoidance of aliasing.

SUMMARY OF THE PRESENT INVENTION

It is an object of this invention to provide a circuit with a built-in self test according to claim 1.

Advantageously, this invention provides a circuit with a built-in self test that provides one hundred percent circuit fault detection.

Advantageously, this invention provides a circuit with built-in test using minimal hardware overhead, thus providing full circuit fault coverage while increasing efficiency in on-board self-testing.

Advantageously, this invention provides a circuit with a built-in self test in which faults propagate immediately through the circuit under test and the compaction circuit, eliminating time delays and aliasing in detecting faults.

Advantageously, according to a preferred example, this invention provides a method of providing a built-in self test for a circuit comprising the steps of: determining a response set of a circuit to be tested; pruning the response set by removing all vertices of the response set that have a degree of one; synthesizing a minimum required logic response of the response set by categorizing the pruned response set into a plurality of at least two categories, wherein no two adjacent vertices of the pruned response are in the same category, and carrying the categorization to the remainder of the response set; and implementing a space compaction circuit according to the minimum required logic response, wherein the space compaction circuit is responsive to the circuit to be tested and outputs an error signal in response to a defect in the circuit to be tested.

Advantageously, according to another preferred example, a circuit with a built-in self test is provided comprising: a circuit to be tested; a generating circuit coupled to the circuit to be tested, wherein the generating circuit generates (i) a series of input signals to the circuit to be tested and (ii) a series of reference signals; a space compaction circuit coupled to an output of the circuit to be tested, wherein the space compaction circuit uses a categorized response of the circuit to be tested to compact the output of the circuit to be tested by a maximum ratio and produces a series of output signals when the input signals are applied to the circuit to be tested; and an analysis circuit coupled to the space compaction circuit and the generating circuit, providing a signal indicative of error in the circuit to be tested when the output signals fail to correspond to the reference signals.

BRIEF DESCRIPTION OF THE DRAWINGS

The present invention will now be described by way of example with reference to the following drawings in which.

DETAILED DESCRIPTION OF THE INVENTION

Figure 2:
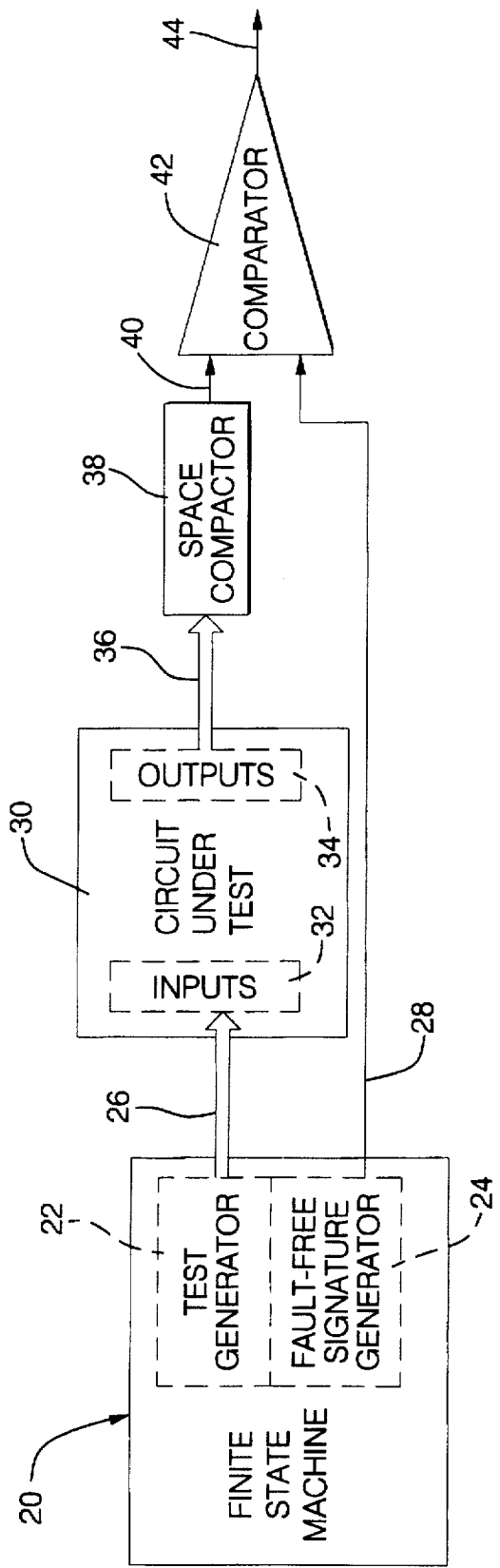
FIG. 2 illustrates an example built-in self-test method and apparatus according to this invention.

Referring now to FIG. 2, the example apparatus shown implements an example method according to this invention as a built-in self test circuit for the circuit under test 30. The circuit under test 30 may be any circuit whose inputs and outputs can be expressed in digital terms and for purposes of this invention is completely generic. The circuit under test 30 has a set of input lines 32 used by the circuit 30 for its typical functions and a set of output lines 34 to which the circuit 30 provides its outputs.

The example in FIG. 2 shows the circuit 20, preferably a finite state machine, including test generator 22 and fault-free signature generator 24. The test generator 22 provides a series of test signals through bus 26 to the inputs 32 of the circuit under test 30. The test generator 22 is designed, according to this invention, to provide sufficient tests to test for every identifiable fault of the circuit under test 30. The signal generator 24 generates a fault-free signature on line 28 as described in more detail below.

The implementation of finite state machines to achieve a desired function, i.e., to generate a desired set of test signals, is well within the level of those skilled in the art. The desired test signals can be generated by those skilled in the art by a fault mode analysis of the circuit under test 30. One example for determining the test signals is by modeling the circuit 30 and analyzing the complete set of single stuck line (SSL) fault models, which analyzes when lines in the circuit are maintained, through a fault, fixed either at a value 0 or at a value of 1, regardless of how else the circuit is operated. For each single stuck line fault mode, a set of input signals is determined to diagnose the fault mode to the point where it propagates to one of the outputs and is reflected in the output signals on bus 36 as an abnormal output. Typically, tests must be found for all 2×N SSL faults in an N line circuit. Also typically, a given test will uncover more than one fault so that in the end, the number of tests implemented is less than 2×N.

As is known to those skilled in the art, software algorithms may be employed to determine the test signals for determining the single stuck line faults by analyzing structural models of the circuit to be tested, iteratively modeling SSL faults in the N lines and generating test signals that detect the SSL faults. Generating the required test signals to propagate to the circuit outputs is known to those skilled in the art, and software aids are available. Example techniques for determining sets of test signals are set forth in Digital Systems Testing and Testable Design, M. Abramovici, M. Breuer and A. Friedman, 1990, AT&T Bell Labs and W. H. Freeman and Company. The result is typically a series of signal patterns to be output by the test generator 22 in sequence to the inputs 32 of the circuit 30. Other fault modes such as bridging faults and those common to RAM, ROM and other memory devices may also be tested for as is desired by the system designer, with test patterns generated to detect such faults.

In operation, the test generator 22 provides on bus 26 a series of test signal patterns to the input 32 of the circuit under test 30. The circuit under test 30 responsively provides a set of outputs on bus 36 to the space compactor 38. The space compactor 38 is provided, according to this invention, to efficiently analyze the outputs of the circuit 30 and to space compact those outputs to as few lines as possible, which, in the preferred example, is a single line 40 that carries a signature signal representing the response of circuit 30 to the test generator 22. The space compactor 38 will be described in more detail below.

The signature on line 40 is provided to a comparator circuit 42, for example, an exclusive OR gate, which also receives a fault-free signature on line 28 from the fault-free signature generator 24. Thus, synchronized with the test signal generator 22, the fault-free signature generator 24 provides the fault-free signature on line 28 to match the output from the space compactor 38 if the entire circuit under test 30 is found to be free of faults. When there is a discrepancy between the signal on line 40 and the fault-free signature on line 28, the comparator 42 provides a signal on line 44 that indicates an error. For example, assuming the comparator 42 is an exclusive OR gate, line 44 will go high only when there is a discrepancy between lines 40 and 28.

Figure 3:
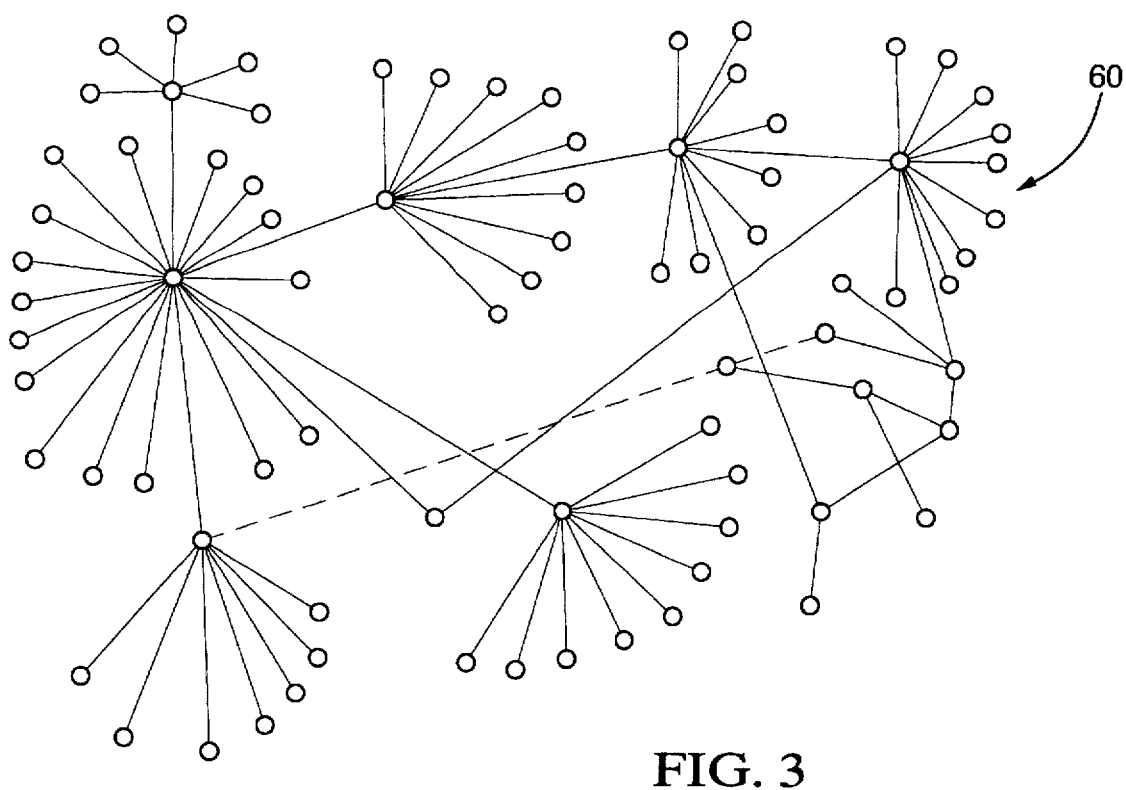
FIGS. 3, 4 and 5 illustrate example steps in defining a space compactor circuit according to this invention.
Figure 4:
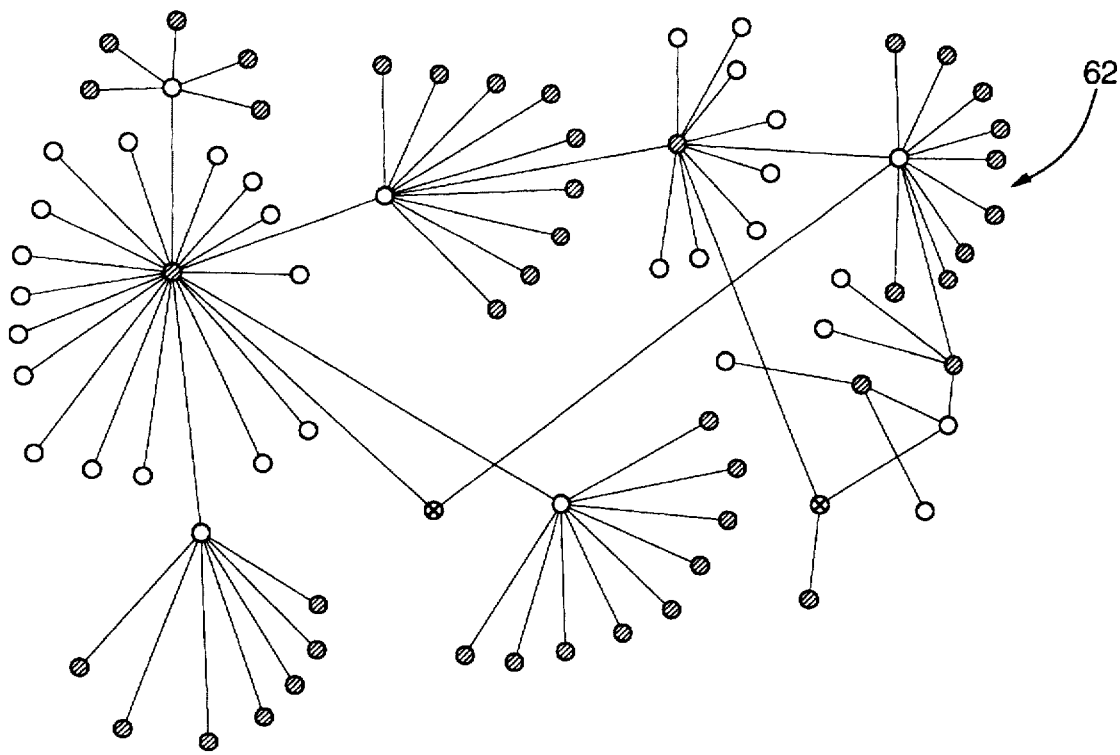
Figure 5:
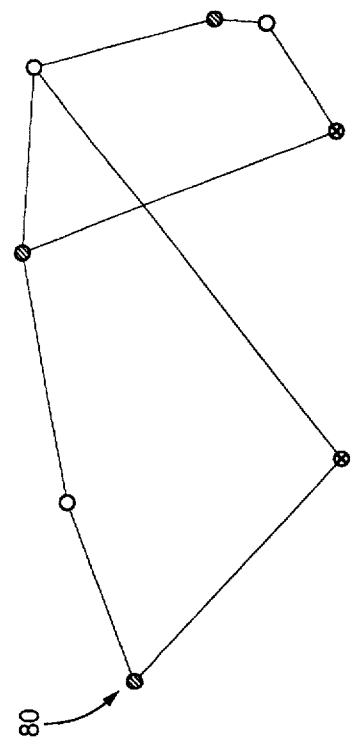

According to this invention, the preferred method for achieving an efficient design of the space compactor 38 is represented pictorially in FIGS. 3–5. More particularly, the response to the circuit under test 30 (FIG. 2) to the complete set of test signals generated by the test generator 22 is graphed in a manner known to those skilled in the art to provide a graph such as 60 shown in FIG. 3, which is the response for a 74181 4-bit ALU circuit of a type known to those skilled in the art. In such graphs, each circle (node) represents a response (i.e., a set of output signals) of the circuit under test 30 to a test input and each edge (i.e., line between two nodes) represents a fault relation between the two nodes that the edge connects. For example, an edge appears between node j and node k if there is a fault that changes the response at node j to that at node k. A node that appears at the center of a "star" represents a fault-free response and a node that appears at the end of a single line represents a fault response. A node that is both at the center of a "star" but also connected to another "star" represents a fault-free response to one or more test patterns but a fault response to other test patterns.

From the response graph 60, a fault effect table is generated whose columns are the faults and rows are the edges of the graphed response. Creating the fault-effect table is easily achieved by one skilled in the art. Using the fault effect table then, a minimum response graph is determined by eliminating the rows that provide redundant fault testing. That is, the minimum number of rows required to account for all of the fault columns are selected as the minimum response set. Thus, FIG. 4 shows a minimum response set 62 of the response set 60 shown in FIG. 3, which has only one line removed therefrom. Thus, as defined herein, the minimum response is the response with all redundant fault coverages removed.

It is not unusual that the minimum fault set almost equal the full fault response set and the step of determining the minimum fault response set may be omitted without significantly impairing efficiency.

The next step in defining the efficient compactor circuit is to prune the minimum response graph shown in FIG. 4 to the pruned minimum response by iteratively removing from the graph all single edge vertices. The result is the graph 80 shown in FIG. 5, in which all vertices are connected on both ends.

Once the pruned response is determined, the required logic response of the compactor circuit is determined by categorizing (also referred to as "coloring") the vertices of the pruned response set. The categorization assigns each vertex a category such that no two adjacent vertices have the same color. The theoretical minimum of categories for any graph having at least two nodes and at least one edge is two. Any graphical system that is colorable in two colors will have a single line output from the optimum response compactor. However, the theoretical minimum is not always achievable, for example, in FIG. 5, three categories are necessary, the open nodes, the filled in nodes and the nodes marked x. A compactor for the system shown in FIG. 5 will have two output lines.

Once the pruned response graph is categorized or colored, the minimum response graph (or, if the minimum response graph is not used, the full response graph) is categorized using the same categorizing scheme. Thus FIG. 4 is shown categorized consistent with FIG. 5.

From the categorized minimum response graph (or full response graph if the minimum response graph is not used) a truth table is easily identified and used to define the compaction circuit. More particularly, in each example, each category is assigned a different binary number, i.e., the open nodes are assigned a 00, the closed nodes are assigned a 01 and the nodes denoted with an x are assigned 11. The truth table is set up so that the logic inputs comprise the response sets for the nodes shown in FIG. 4 (or FIG. 3 if the minimum set is not used) and the logic output for each input is the numeral designating the category for that node. An example truth table for a simple logic function:

$$Z=Z_1Z_2+Z_2Z_3+Z_1Z_2'z_3'$$

appears as:

| $z_1$ | $z_2$ | $z_3$ | z |
|---|---|---|---|
| 0 | 0 | 0 | 0 |
| 0 | 0 | 1 | 0 |
| 0 | 1 | 0 | 1 |
| 0 | 1 | 1 | x |
| 1 | 0 | 0 | 1 |
| 1 | 0 | 1 | 0 |
| 1 | 1 | 0 | 0 |
| 1 | 1 | 1 | 1 | where the x represents a "don't care" on the output z. From such response graphs, the compaction circuit as easily implemented according to the truth table. In more complex circuits, commercially available design software such as EPOCH™, from Cascade Design Automation, may be used to reduce the truth table to the logic circuit.

Figure 6:
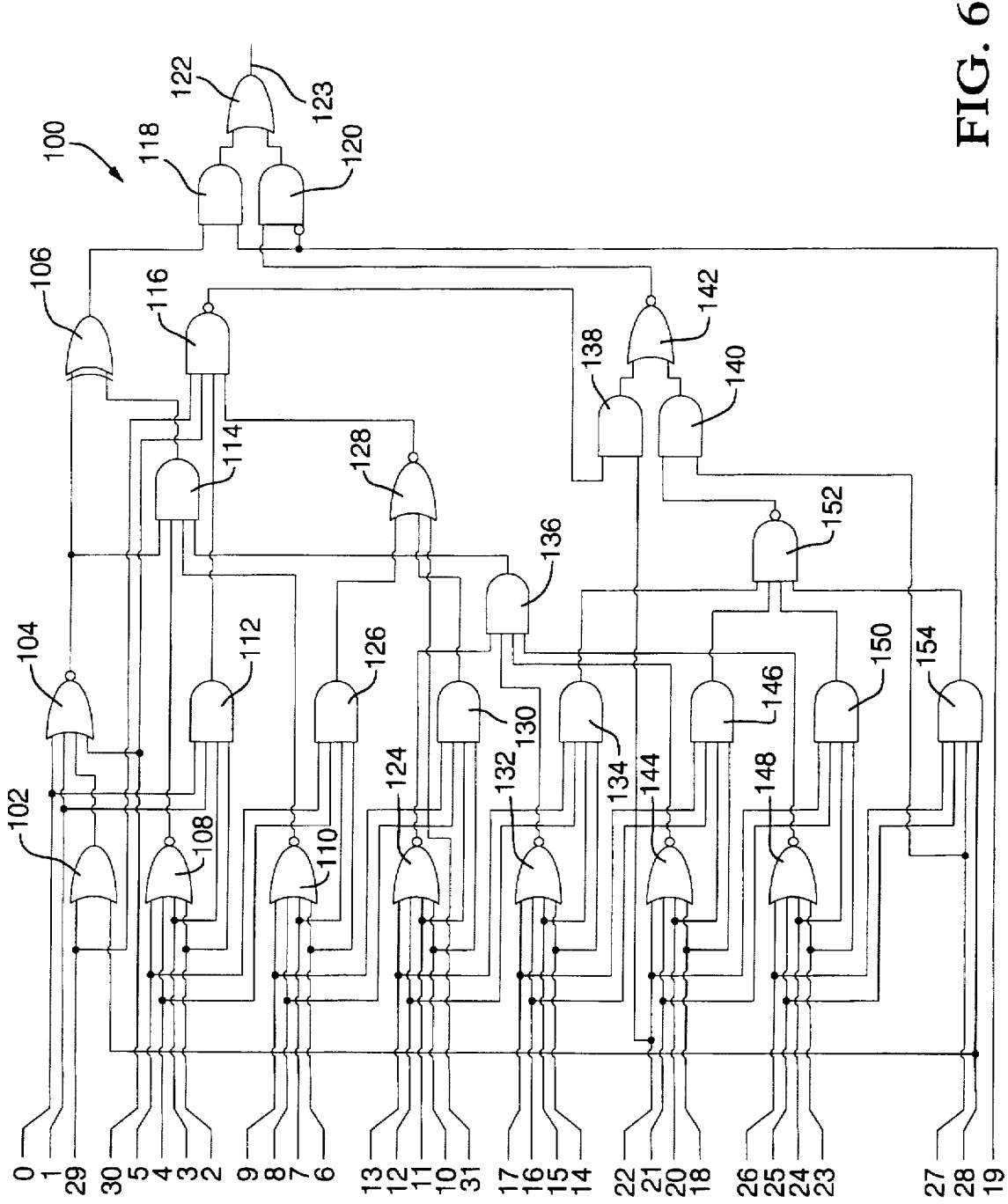
FIG. 6 illustrates an example space compactor circuit according to this invention.

Referring now to FIG. 6, the circuit 100 shown is a single output compactor for a c499 circuit (the circuit under test 30) which is a circuit known to those skilled in the art and used in benchmarking testing methods. The compactor is designed to work with the c499 circuit with the test generator 22 implementing the standard 52 test pattern described in High Level Test Generation Using Physically Induced Faults, by M. C. Hanson and J. P. Hayes, Proc. 1995, VLSI Test SYMP., PP. 20-28.

The circuit 100 includes OR gates 102 and 122, NOR gates 104, 108, 110, 124, 132, 144, 148, 128 and 142, AND gates 112, 126, 130, 134, 146, 150, 154, 136, 114, 118 and 120, exclusive OR gate 106, and NAND gates 152 and 116 to compact the 32 outputs of the c499 into a single output line 123 that carries the signature of the c499 circuit. The compaction circuit shown propagates all faults detected using the 52 test patterns described by Hanson and Hayes, thus providing 100 percent fault coverage.

Using a weighted gate count, which is the gate count multiplied by the average fanin, the space compactor 100 shown in FIG. 6 requires about 17 percent overhead in hardware for the c499 circuit.

Figure 1:
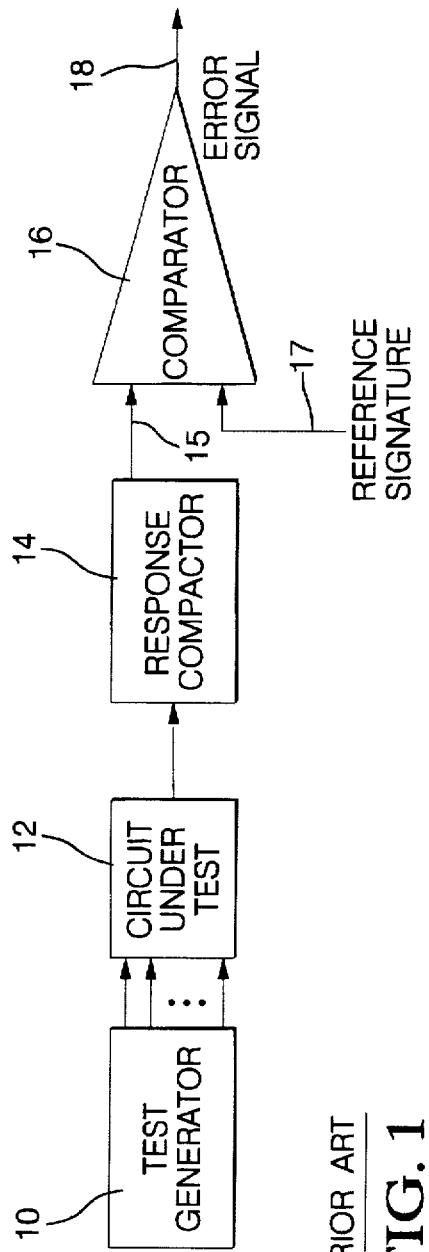
FIG. 1 illustrates a prior art built-in self-test method.

The fault free signature to be generated by the generator 24 (FIG. 1) is determined by modeling, i.e., in a software design aid, the circuit under test 30 and the compaction circuit arrived at according to the above design method and by applying the test pattern to the circuit under test (no faults are built into the model). The resulting signature from the output of the compactor is the signature that must be produced by the fault free signature generator 24. Implementation of a state machine to generate the signature is well within the level of one skilled in the art.

Figure 7:
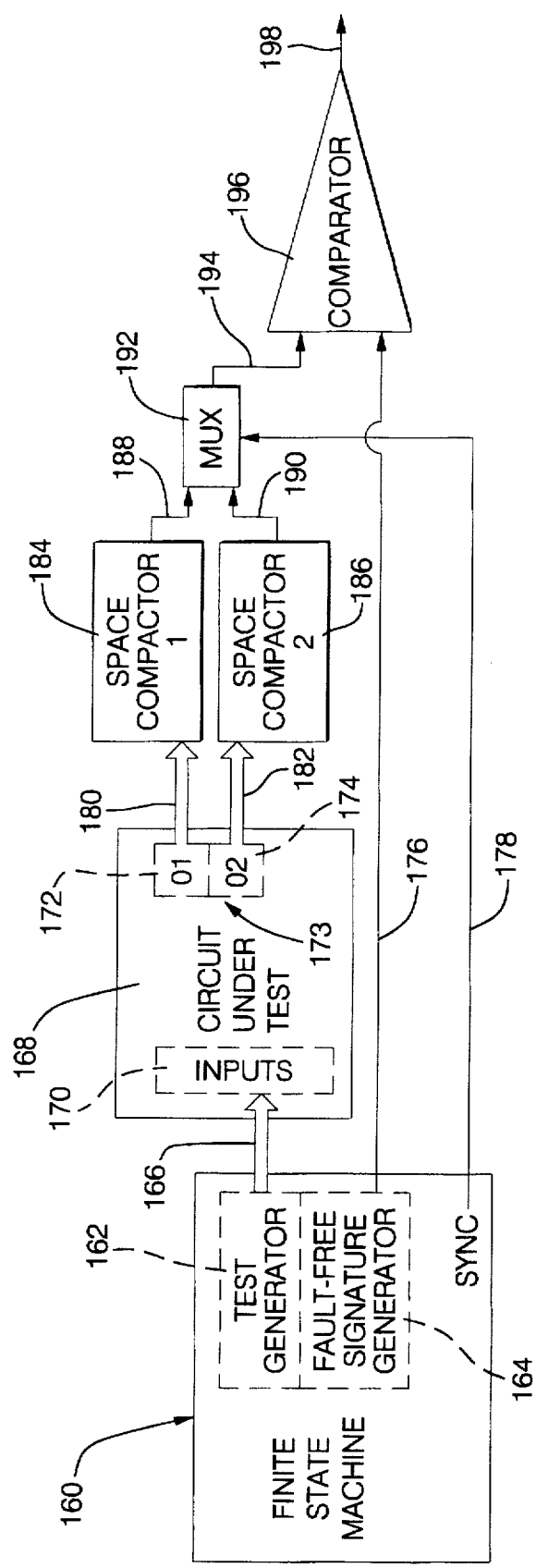
FIG. 7 illustrates a second example method and apparatus according to this invention.

Referring now to FIG. 7, another example of this invention that may simplify design of the compactor circuit is shown. The circuit in FIG. 7 includes the finite state machine 160 with the test generator 162, the fault-free signature generator 164 and also a sync output to line 178 whose purpose will be described below. The test generator provides the predetermined test pattern on bus 168 to the inputs 170 of the circuit under test 168. The outputs of the circuit under test 168 designated by reference 173, are divided into two subsets, outputs 172 and outputs 174.

Each set of outputs 172, 174 is treated separately in the design process described above for determining a space compactor circuit, thus yielding space compactor 184 receiving the subset of outputs 172 through bus 180 and space compactor 186 receiving the subset of outputs 174 through bus 182. Dividing the outputs into subsets and designing a separate space compactor 184, 186 for each set of outputs may simplify complex logic specifications required to design single space compactors for systems with large output sets. For example, in implementing this invention with a c880 circuit (another circuit known to those skilled in the art and commonly used to benchmark self test circuits), the logic synthesis software was unable, due to memory limitations, to process all of the logic specifications into a single space compactor circuit. However, when the outputs 173 were divided into two subsets 172 and 174 and each was treated separately and provided its own space compactor, the design synthesis software was able to complete the task. If desired, the outputs 173 could be divided into three or more subsets to further simplify the space compactor designs. It is noted that, to improve efficiency, the space compactor 184 is not designed to detect faults accounted for by space compactor 186 and space compactor 186 is not designed to detect faults accounted for by space compactor 184.

The outputs of the space compactors 184 and 186 are provided through lines 188 and 190 to the multiplexer 192. The multiplexer 192 is clocked by the sync signal on line 178, which provides a predetermined pattern directing the multiplex 192 when to selectively couple the two lines 188 and 190 to the output 194. The output of the multiplexer on line 194 is provided to the comparator 146, which compares the multiplexed space compactor signatures to the fault-free signature generated by the generator 164 and provides an error signal on line 198 when there is a variance between the actual signature on line 194 and the fault free signature on line 176.

Figure 8:
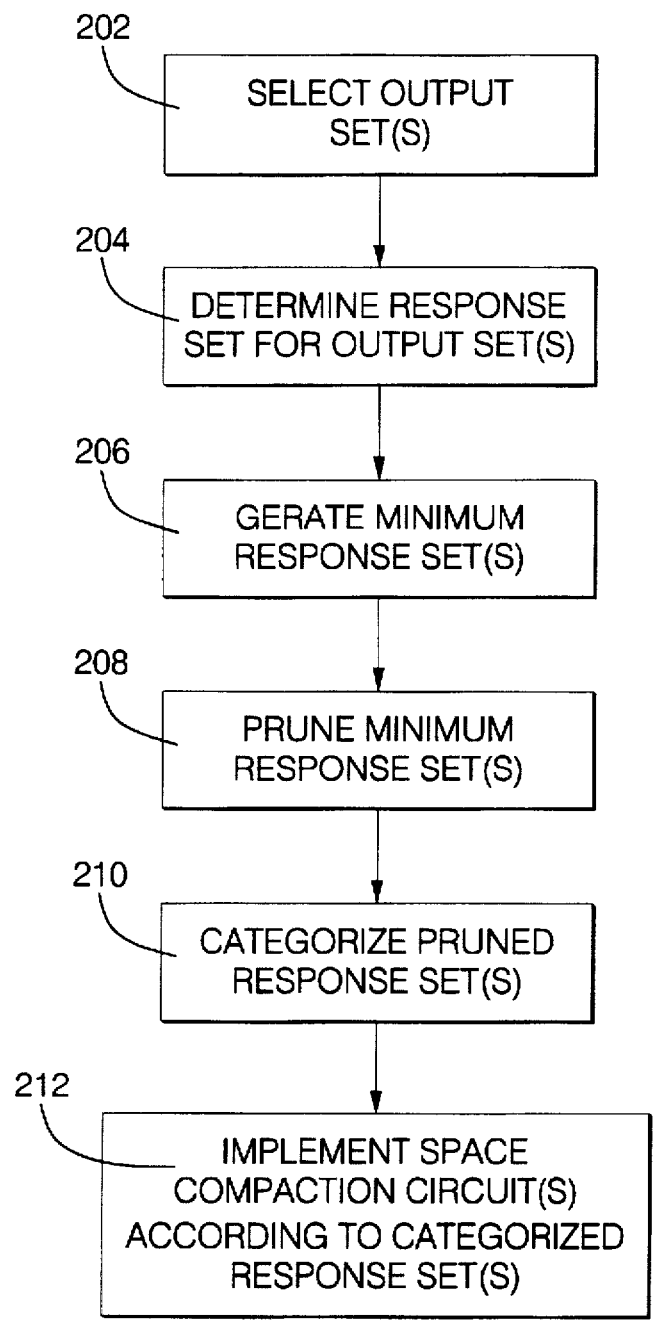
FIG. 8 illustrates example steps for the method according to this invention.

Referring now to FIG. 8, the built-in self-test method described above is illustrated by blocks 202–212. At block 202, the output sets of the circuit under test are selected. For example, the complete output set may be used as a single set in conjunction with a single space compactor, as shown in FIG. 2, or it may be divided into several subsets each having its own space compactor, as shown in FIG. 7. At block 204, the response set for the output sets is determined, for example, as described above using a single stuck line approach. The response set is then pared down to the minimum response set at step 206 using, for example, a fault table, and eliminating redundant fault coverages. Then at step 208, the minimum response set is pruned by removing all single edge vertices to arrive at the pruned minimum response set. At block 210, the pruned minimum response sets are categorized, for example, using coloring, and the categorization is applied back to the minimum response set. Then at block 212, a compaction circuit according to the categorized response set or sets can be implemented preferably using logic synthesis software of the type described above and readily available to those skilled in the art as a design aid resulting in a space compactor circuit that provides 100 percent fault coverage with minimum use of hardware overhead.

In examples such as shown in FIGS. 4 and 5 where the system responses cannot be categorized into two categories, the output of the compaction circuit, as mentioned above, will have two or more lines. The compaction circuit can be modified to have a single line output, however, by multiplexing the outputs of the compaction circuit to a single line.

Figure 9:
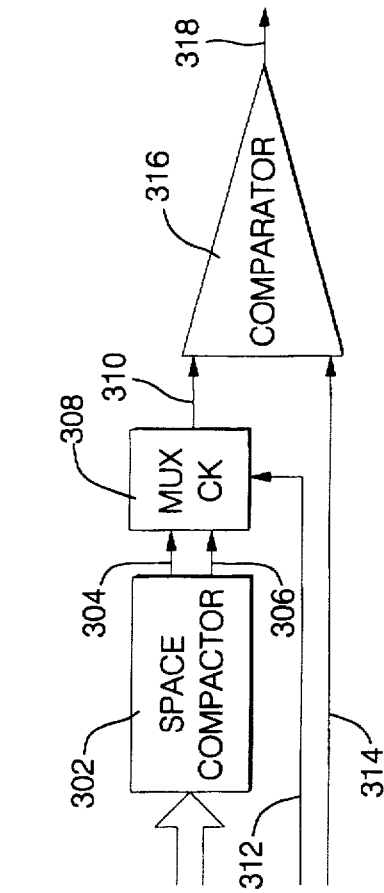
FIG. 9 illustrates another example method and apparatus according to this invention.

An example of this is shown with reference to FIG. 9. The space compactor 302 requires two output lines 304 and 306, which are provided to separate inputs of multiplexer 308. The test signals are applied twice to the circuit under test (not shown in the figure), the first time, the line 304 is coupled to the multiplexer output line 310 and the second time the line 306 is applied to the output line 310. The clock input for the multiplexer is provided by the state machine (not shown) on line 312. The output of the multiplexer on line 310 is compared to a fault free signature on line 314 by comparator 316, which outputs a signal on line 318 whenever an error is detected. This technique increases the amount of time to run the test, N full test sequences must be run for an N output space compactor, but the total time is sufficiently short that the practical effect of the time increase is minimal. The alternative is a comparator that compares the two line signature output from compactor 302 to a two line signature generated by the signature generator. Such comparators are easily implemented by those skilled in the art.

It can be shown that for a given circuit under test, if the response graph (i.e., of the type shown in FIG. 3) is fully connected and is two categorizeable in two colors, the maximum efficiency for a zero aliasing maximum compaction ratio space compactor is provided according to this invention.

We claim:

1. A built-in self test circuit method comprising the steps of:

determining a response set of a circuit to be tested;

pruning the response set by removing all vertices of the response set that have a degree of one;

synthesizing a minimum required logic response of the response set by categorizing the pruned response set into a plurality of at least two categories, wherein no two adjacent vertices of the pruned response are in the same category, and carrying the categorization to the remainder of the response set; and implementing a space compaction circuit according to the minimum required logic response, wherein the space compaction circuit is responsive to the circuit to be tested and outputs an error signal in response to a defect in the circuit to be tested.

2. A built-in self test circuit method according to claim 1, wherein the response set is minimized by eliminating redundant fault coverages.

3. A built-in self test circuit method according to claim 1 wherein all errors in the circuit to be tested propagate through the compaction circuit with zero aliasing.

4. A built-in self test circuit method according to claim 3, wherein error propagation through the compaction circuit is substantially instantaneous.

5. A built-in self test circuit method according to claim 1 wherein the compaction circuit output consists of one output line.

6. A circuit with a built-in self test, comprising:

a circuit to be tested;

a generating circuit coupled to the circuit to be tested, wherein the generating circuit generates (i) a series of input signals to the circuit to be tested and (ii) a series of reference signals;

a space compaction circuit coupled to an output of the circuit to be tested, wherein the space compaction circuit uses a categorized response of the circuit to be tested to compact the output of the circuit to be tested by a maximum ratio and produces a series of output signals when the input signals are applied to the circuit to be tested;

an analysis circuit coupled to the space compaction circuit and the generating circuit, providing a signal indicative of error in the circuit to be tested when the output signals fail to correspond to the reference signals.

7. A built-in self test circuit method comprising the steps of:

dividing a set of outputs of a circuit to be tested into a plurality of subsets of outputs;

determining a separate response set for each subset of outputs;

for each response set: pruning the response set by removing all vertices that have a degree of one, synthesizing a minimum required logic response of the response set by categorizing the pruned response set into a plurality of at least two categories, wherein no two adjacent vertices of the pruned response set are in the same category, carrying the categorization to a remainder of the response set and implementing a separate space compaction circuit according to each minimum required logic response, wherein the space compaction circuits are responsive to the circuit to be tested and at least one of the separate space compaction circuits outputs an error signal in response to a defect in the circuit to be tested.

8. The circuit method of claim 7, wherein each response set is minimized by eliminating redundant fault coverages.

9. A circuit with a built in test, comprising:

a circuit to be tested having outputs;

a generating circuit coupled to the circuit to be tested, wherein the generating circuit generates (i) a series of input signals to the circuit to be tested and (ii) a series of reference signals;

a plurality of space compaction circuits coupled to an output of the circuit to be tested, wherein each space compaction circuit is responsive to a subset of the outputs of the circuit to be tested to compact the subset of outputs of the circuit to be tested and produces a series of output signals when the input signals are applied to the circuit to be tested; and an analysis circuit coupled to the space compaction circuits and the generating circuit, providing a signal indicative of error in the circuit to be tested when the output signals fail to correspond to the reference signals.

10. A circuit with built in test according to claim 9, also comprising:

a multiplexing circuit coupled between the space compaction circuits and the analysis circuit, wherein each space compaction circuit is selectively coupled to the analyzing circuit.

* * * * *